Dec. 16, 1969  H. REHN ET AL  3,484,053
CAMERA WITH TAKE-UP SPOOL
Filed May 8, 1968  2 Sheets-Sheet 1

RADIUS OF 6 MINUS RADIUS OF 5 = THICKNESS OF FILM 9

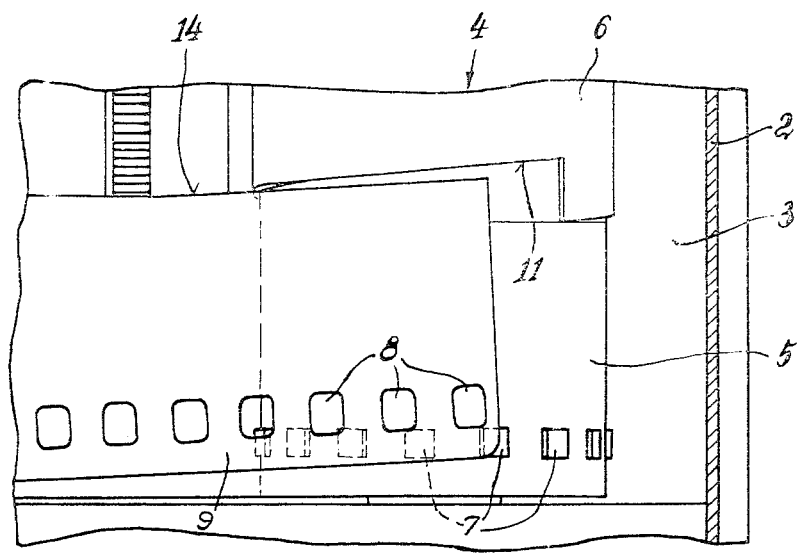
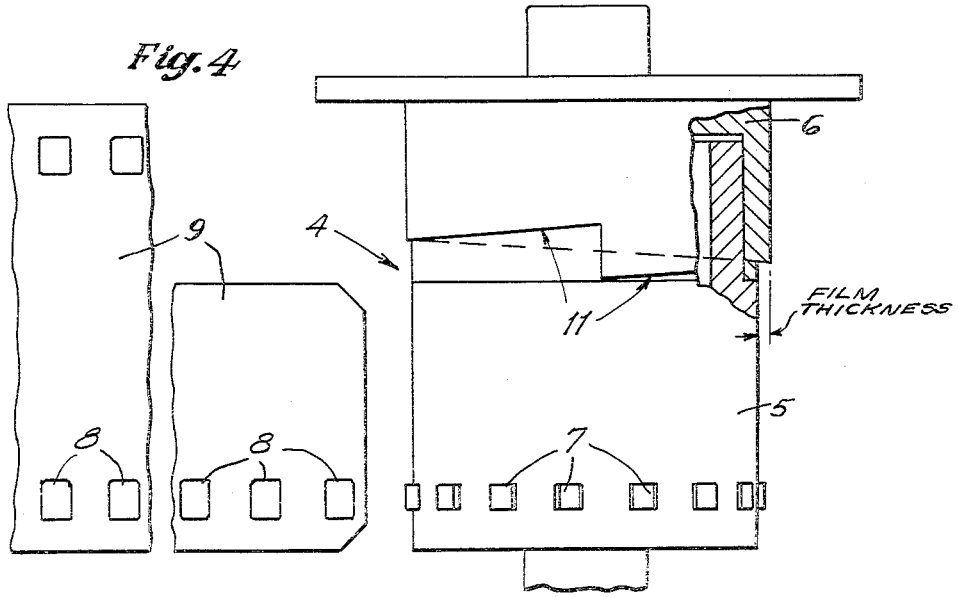

United States Patent Office 3,484,053
Patented Dec. 16, 1969

3,484,053
CAMERA WITH TAKE-UP SPOOL
Heinz Rehn, Friedrich Papke, and Paul Greger, Braunschweig, Germany, assignors to Voigtländer, A.G., Braunschweig, Germany
Filed May 8, 1968, Ser. No. 727,533
Claims priority, application Germany, Jan. 25, 1968, V 35,310
Int. Cl. B65h 75/28
U.S. Cl. 242—74                  8 Claims

ABSTRACT OF THE DISCLOSURE

A camera wherein film is wound onto a take-up spool. The take-up spool has an exterior surface provided with circumferentially distributed projections for engaging a film strip in perforations thereof. This take-up spool has a pair of spool portions of different diameters. The spool portion of smaller diameter is adapted to be engaged by a leader of the film strip, this leader having a width which is less than the width of the remainder of the film strip. The spool portion of larger diameter is coaxial with the spool portion of smaller diameter and its diameter is greater than the diameter of the smaller spool portion by an amount approximately equal to twice the film thickness.

BACKGROUND OF THE INVENTION

The present invention relates to cameras.

In particular, the present invention relates to take-up spools of cameras.

Such take-up spools are conventionally provided with circumferentially distributed projections to engage a film strip in the perforations thereof, and also a suitable spring assembly or the like is used for pressing the film toward the take-up spool.

Structures of this general type are used for automatically connecting the leader portion of a film strip to the take-up spool when the leader of the film strip is initially situated in the operating region of the projections of the take-up spool.

The leader portion of a film strip which has at its sides a pair of rows of perforations has a tongue-shaped configuration of a width which is approximately half the width of the remainder of the film strip, the film strip widening out to its full width at the trailing end of the leader. Therefore, the part of the film winding which initially engages the take-up spool does not extend over the full width of the film strip, so that as a result the initial portion of the film strip has an insecure, one-sided engagement with the take-up spool. This factor is of particular disadvantage particularly in those cases where the take-up spool pulls on the film and is the component which brings about advancing of the film in the camera.

SUMMARY OF THE INVENTION

It is accordingly a primary object of the present invention to provide a take-up spool structure which will avoid these drawbacks.

In particular, it is an object of the present invention to provide a take-up spool structure which will be very reliably engaged in a fully automatic manner by the film so that the latter will be securely wound onto the take-up spool.

Furthermore, it is an object of the present invention to provide a construction which will guarantee proper engagement between the projections of the take-up spool with the film strip in the perforations thereof even if the leader of the film strip initially does not have a proper engagement with the take-up spool.

Thus, in accordance with the invention the take-up spool is composed of a pair of cylindrical portions of different diameters. The take-up spool portion of smaller diameter is situated so as to be engaged by the leader portion of the film strip which is narrower than the remainder thereof, while the take-up spool portion of large diameter has a diameter which is greater than that of the spool portion of smaller diameter by approximately twice the thickness of the film.

With this construction the leader of the film strip will initially engage the take-up spool portion of smaller diameter, so as to compensate for the difference between the diameters of the take-up spool portions, in such a way that the leader will complete the exterior surface of the take-up spool forming therefrom in effect a single cylinder of constant diameter, and in this way the film will be very reliably supported throughout its entire width on the take-up spool.

The take-up spool portion of larger diameter terminates at its junction with the spool portion of smaller diameter in a sharp edge which extends around the axis of the take-up spool along a helix having a single convolution so that during turning of the take-up spool a side edge of the leader of the film strip will be engaged by this sharp edge of the spool portion of larger diameter to be displaced thereby, if necessary, toward the projections of the take-up spool so that these projections will reliably enter into the film perforations to engage the film in the perforations thereof and provide for proper advancing of the film by the take-up spool. Therefore, even if initially the leader of the film strip does not properly engage the take-up spool, nevertheless it will be reliably displaced in a fully automatic manner to a proper position with respect to the take-up spool to provide proper winding of the film onto the take-up spool.

BRIEF DESCRIPTION OF DRAWINGS

The invention is illustrated by way of example in the accompanying drawings which form part of this application and in which:

FIG. 3 shows in a view similar to that of FIG. 2 how the structure of the invention operates to properly position in an automatic manner the leader of a film strip which initially is not properly situated with respect to the take-up spool.

FIG. 4 shows a front elevation showing a complete spool.

DESCRIPTION OF A PREFERRED EMBODIMENT

Figure 1:
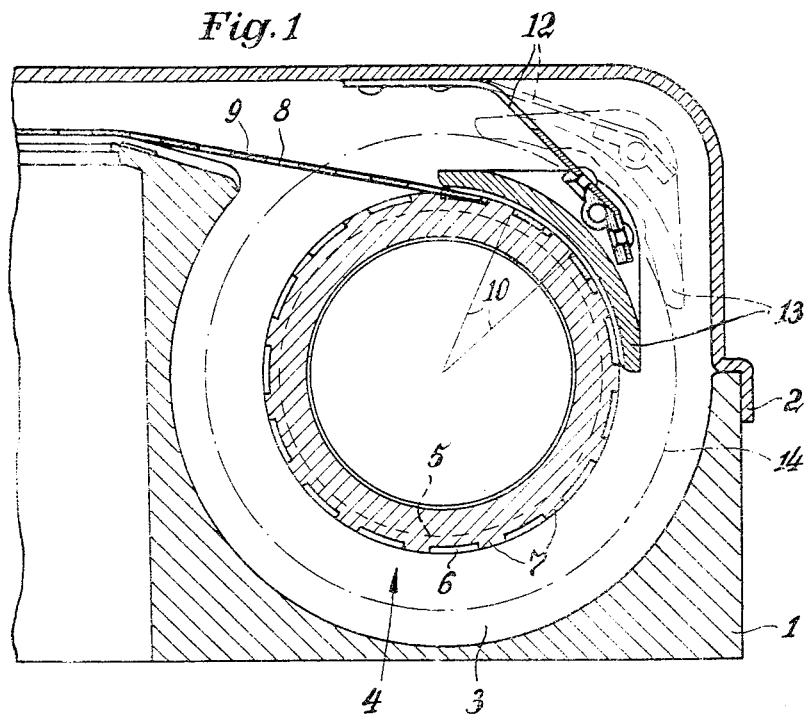
FIG. 1 is a fragmentary sectional plan view of that part of a camera which is provided with a take-up spool of the invention, the section of FIG. 1 being taken along line I—I of FIG. 2 in the direction of the arrows.
Figure 2:
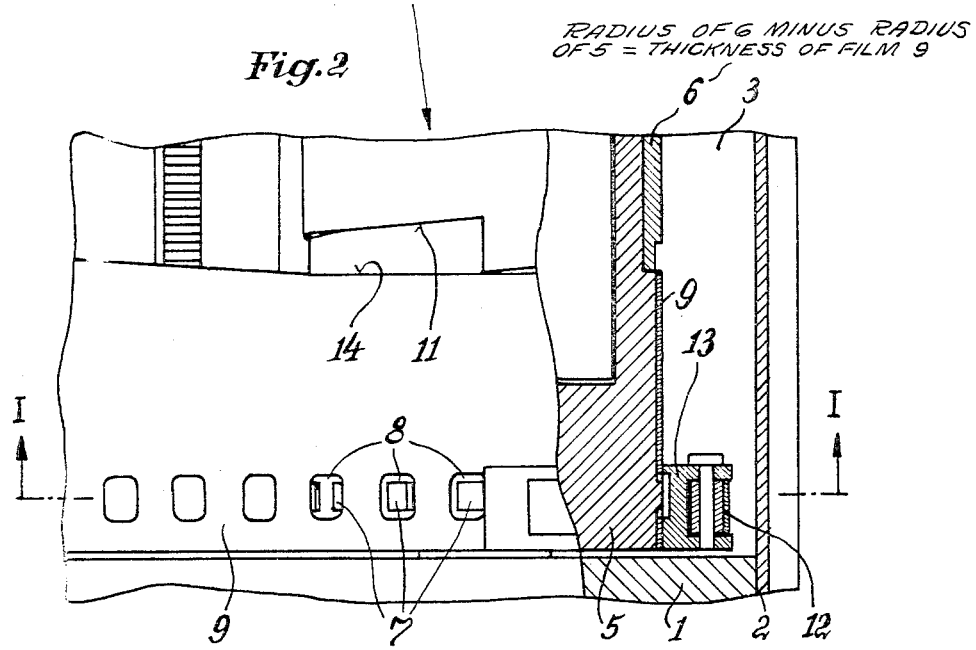
FIG. 2 is a fragmentary, partly sectional rear view of the camera structure of FIG. 1 with the rear wall of the camera omitted from FIG. 2.

Referring now to FIGS. 1 and 2, there is illustrated therein, in a fragmentary manner, part of a camera housing 1 which is provided with a rear closure wall 2 capable of being displaced to and from the closed position thereof illustrated in FIG. 1. The illustrated part of the camera forms the take-up spool chamber 3 within which there is supported for rotary movement a take-up spool 4. This take-up spool 4 of the invention includes a cylindrical portion 5 and a cylindrical portion 6, the portion 6 having a diameter greater than that of the portion 5. While the take-up spool 4 can be made in one piece, it is preferred to make it of at least a pair of components 5 and 6 wherein the component 6 of larger diameter is in the form of a tubular member which is mounted upon the portion 5 of smaller diameter.

The exterior surface of the spool 4, at its portion 5, is provided with a row of circumferentially distributed projections 7 adapted to engage the film strip 9 in the perforations 8 thereof. These projections 7 extend, as is particularly apparent from FIG. 1, from the exterior surface of the portion 5 of the spool through a distance which is approximately equal to the thickness of the film 9. Moreover, these projections 7 have film-engaging edges respectively situated in planes 10 which intersect each other at and coincide with the longitudinal central axis of the take-up spool 4. Thus, the projections 7 will engage behind edges of the film to a small extent when the rotary take-up spool 4 is turned in a clockwise direction, as viewed in FIG. 1.

At the boundary between the spool portions 5 and 6, the spool portion 6 of larger diameter terminates in a sharp edge. As is apparent from FIGS. 2 and 3, this sharp edge 11 extends along a helix around the longitudinal central axis of the spool, and in the preferred construction this helix takes the form of a single convolution extending all of the way around the axis of the spool.

As may be seen from FIG. 2, the diameter of the spool portion 6 is greater than the diameter of the spool portion 5 by an amount which is approximately equal to twice the film thickness, so that after the tongue-shaped leader portion of the film strip is initially wound on the spool portion 5, the exterior surface of this initially wound convolution of the film strip will have the same exterior diameter as the spool portion 6 of large diameter, forming a cylindrical extension of the exterior surface of the spool portion 6 of larger diameter, so that the full width of the film 9 can then be very reliably and securely wound onto the spool portion 6 and the leader of the film strip.

A leaf spring 12 is fixed at one end to the rear wall 2 at an inner surface of the latter, and this spring 12 pivotally carries a pressure member 13 which, when the rear wall 2 is in its closed position, engages the film 9 in the region of its perforations 8 and presses the film toward the exterior surface of the spool portion 5. FIG. 1 shows in dotted lines the position assumed by the pressure member 13 when the film 9 has been fully wound onto the take-up spool 4, the dot-dash line 14 indicating the complete film winding.

The above-described structure operates in the following manner:

The tongue-shaped leader portion of the film strip which projects from the film cartridge has an inherent prestress which, when the film cartridge is introduced into the camera and the leader of the film strip is placed in engagement with the spool 4, causes the film to seek due to its inherent resiliency to press against the take-up spool. When the rear wall 2 of the camera is displaced to its closed position, the pressure member 13 engages the film and presses it toward the take-up spool, so that when the film-advancing lever is actuated by the operator the spool 4 will be turned, and if initially the projections 7 are not in the film perforations then these projections 7 will move into the perforations 8 so as to pull on the film 9 and wind it onto the take-up spool 4.

If it should happen that initially the film 9 is not properly introduced so that it has a proper engagement with the take-up spool, as illustrated in FIG. 3, so that the initial leader of the film has its perforations 8 situated beyond the operating region of the projections 7 preventing the stationary film 9 from receiving the projections 7 in the perforations 8, then the sharp edge 11 of helical configuration of the take-up spool comes into play. Thus, during the rotary movement of the take-up spool 4, the edge 11 engages the edge 14 of the leader of the film strip, and as a result of the helical configuration of the edge 11 the film strip is displaced toward the projections 7, in a downward direction as viewed in FIG. 3, until the perforations 8 become situated in the operating region of the projection 7 to receive the latter and thus to commence the winding of the film on the take-up spool 4. In FIG. 2 the film is shown in the position to which it has automatically been displaced by the edge 11 with respect to the spool 4 so that the film is properly positioned on the take-up spool.

Thus, with the structure of the invention the formation of a solid film winding fully engaging the spool 4 in a proper manner is assured. Moreover, with the structure of the invention even if it should happen that the film is not initially introduced into the camera in a proper manner, nevertheless in a fully automatic manner the film will be displaced to a proper position with respect to the take-up spool to be operatively connected therewith so as to be properly wound thereon.

What is claimed is:

1. In a camera, a rotary take-up spool having at its exterior surface a plurality of circumferentially distributed projections for engaging a film strip in perforations thereof, said spool including a pair of coaxial cylindrical portions of different diameters, the spool portion of smaller diameter being adapted to engage a film strip leader which is narrower than the remainder of the film strip, and the spool portion of larger diameter having a diameter greater than that of the spool portion of smaller diameter by approximately twice the film thickness.

2. The combination of claim 1 and wherein said spool portion of larger diameter terminates in a sharp edge at its junction with the spool portion of smaller diameter.

3. The combination of claim 2 and wherein said sharp edge of said spool portion of larger diameter extends along a helix around a longitudinal axis of said take-up spool.

4. The combination of claim 3 and wherein said sharp edge forms a helix having only one convolution.

5. The combination of claim 1 and wherein said spool portions are in the form of separate bodies assembled together to form the take-up spool.

6. The combination of claim 5 and wherein said spool portion of larger diameter is in the form of a tubular component mounted on the spool portion of smaller diameter.

7. The combination of claim 1 and wherein said projections of said take-up spool respectively have film-engaging edges respectively situated in planes which intersect at and coincide with a longitudinal central axis of said take-up spool.

8. The combination of claim 1 and wherein said camera has a rear wall, a spring fixed to said rear wall, and a pressure member carried by said spring and urged thereby against film in the region of perforations thereof for urging the film against the take-up spool.

References Cited

UNITED STATES PATENTS 3,414,206  12/1968  Ramig _____ 242—74 X

FOREIGN PATENTS 861,503  1/1953  Germany.

NATHAN L. MINTZ, Primary Examiner